Feb. 13, 1968     H. C. POPE     3,368,704

VEHICLE LOADING AND UNLOADING APPARATUS

Filed Jan. 5, 1966     4 Sheets-Sheet 1

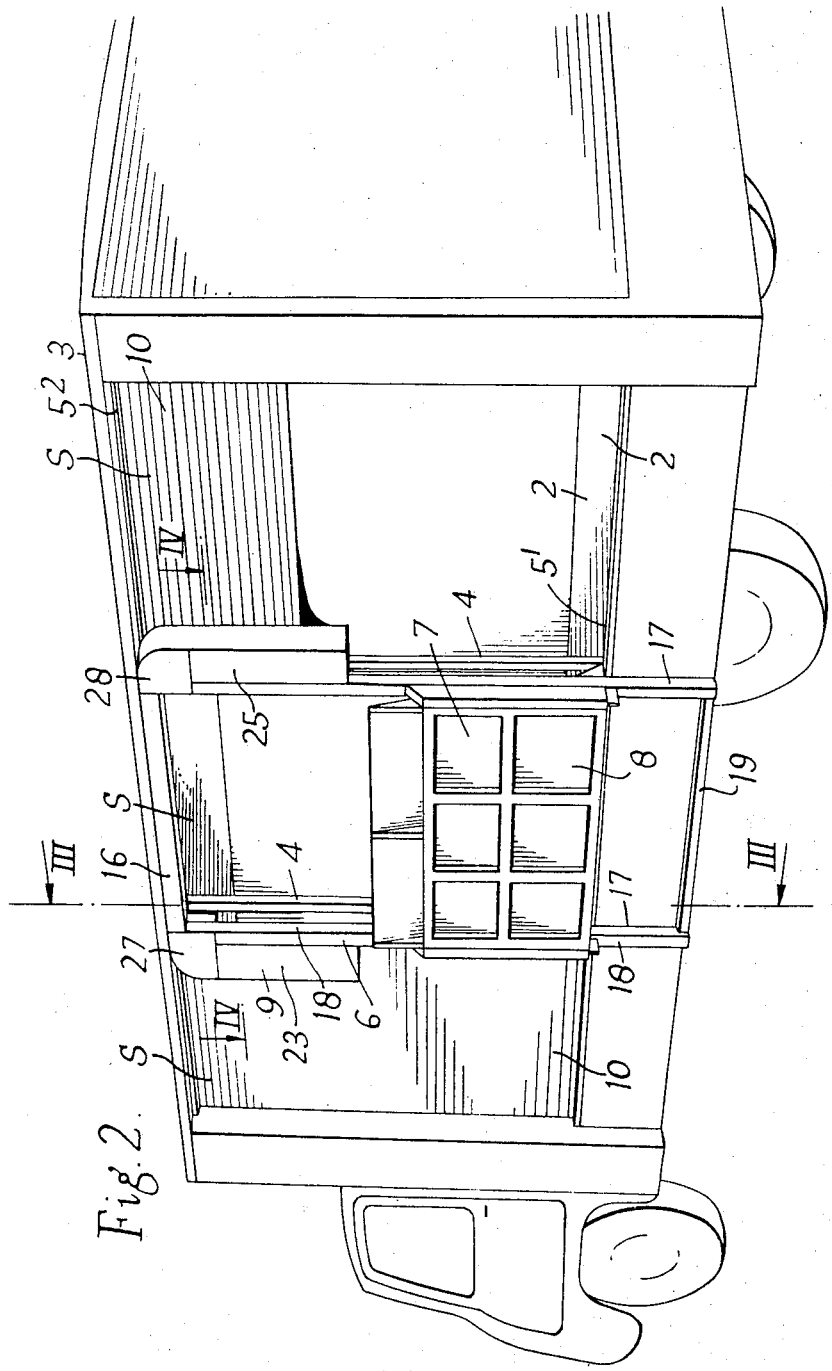

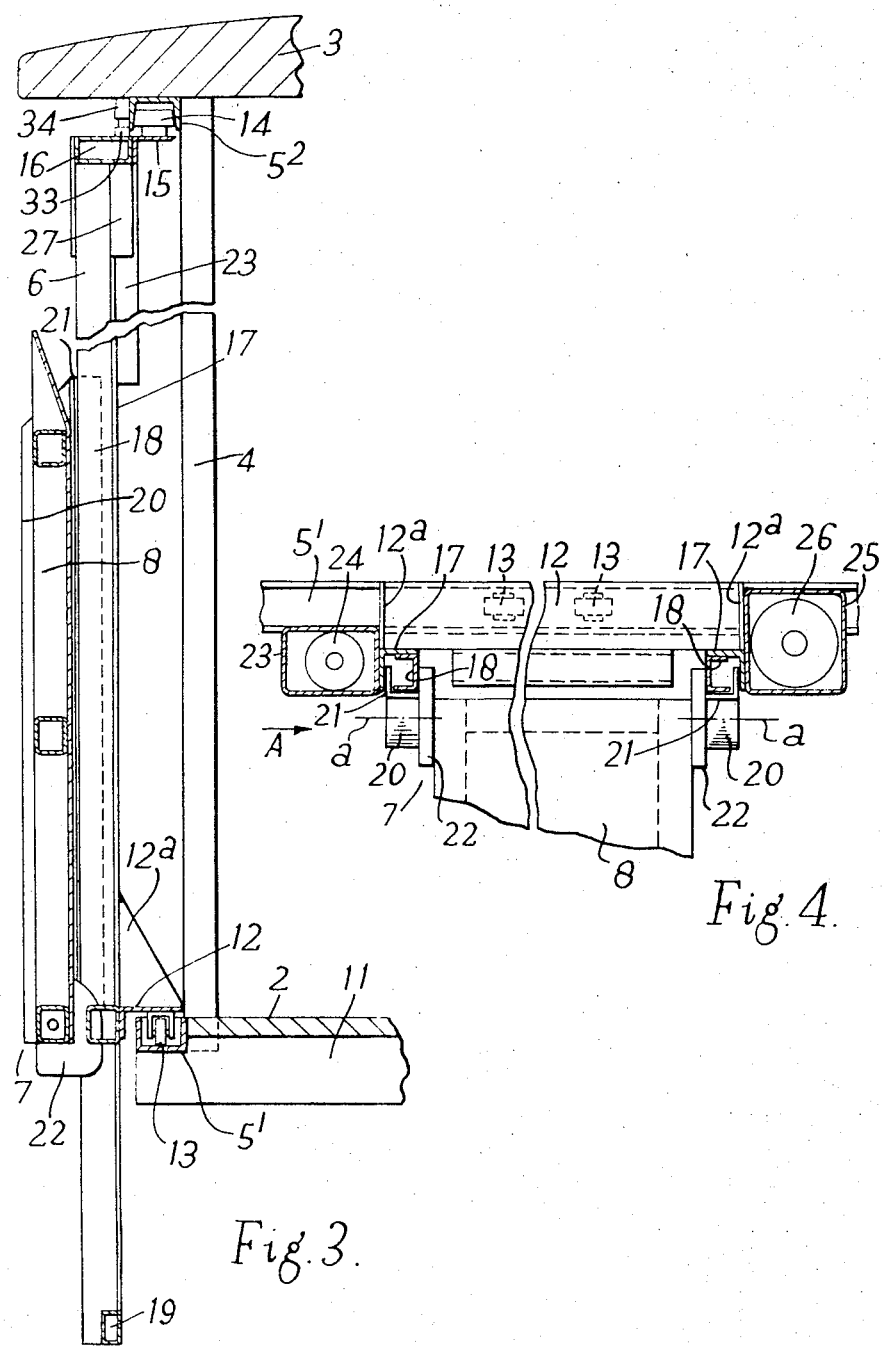

United States Patent Office 3,368,704
Patented Feb. 13, 1968

3,368,704
VEHICLE LOADING AND UNLOADING
APPARATUS
Henry C. Pope, Harpole, England, assignor to H. C.
Pope Limited, Northampton, England, a corporation
of Great Britain
Filed Jan. 5, 1966, Ser. No. 518,944
11 Claims. (Cl. 214—75)

ABSTRACT OF THE DISCLOSURE

A wheeled vehicle having a body and a load-bearing floor and provided at one side at least, of its body, with a framework forming a plurality of loading stations. Mounted for movement up and down on a second framework which is itself horizontally movable from station to station along vertically-spaced guides on said first framework, is a load-carrying structure for lifting goods between ground level and at least one other level at or above the level of the load-bearing floor.

---

This invention relates to vehicle loading and unloading apparatus.

Various forms of apparatus are already known for facilitating the loading and unloading of vehicles, especially road vehicles such as vans and lorries, the said apparatus customarily comprising means movable heightwise between approximately ground level and at least one other level at, or above, that of a load-supporting floor of the vehicle. However, although such apparatus is most useful it does suffer from the disadvantage that the goods have to be raised and lowered at one particular location—usually the rear—of the vehicle. This, for instance, applies to a tail gate lift. Accordingly, the use of prior forms of vehicle loading and unloading apparatus entail considerable re-positioning of goods on the vehicle floor or/and on shelves in the case of tiered loading. Moreover, these prior forms of apparatus are very limited in scope and awkward when heavy goods, such as barrels, crates, palletized loads, and so on, are involved and/or when a vehicle is required to make frequent calls to deliver goods and at the same time collect empty containers or the like.

The object of the present invention is to provide on or for application to a vehicle an improved loading and unloading apparatus designed to obviate or at least minimise the foregoing disadvantages, as will be hereinafter described.

The vehicle loading and unloading apparatus provided by this invention comprises substantially horizontal guides spaced or for spacing heightwise on a framework at a side of a vehicle, a frame movable along the guides from one to another of a plurality of loading and unloading stations in the vehicle body, a load-carrying structure mounted for movement up and down the said frame and means for effecting such up and down movements.

Heightwise spaced horizontal guides having mounted therein a traversing frame supporting a load-carrying structure as just described may be provided at either or at each lateral side of the vehicl.

The or each load-carrying structure may conveniently include a platform which is hinged or pivotally mounted so that it can be readily swung down for use, and folded up neatly for storage within the overall width of the vehicle body when out of commission.

A vehicle fitted with the improved apparatus, especially if there is a traversing lift at both sides, accordingly has an all round ability to load and unload.

Figure 1:
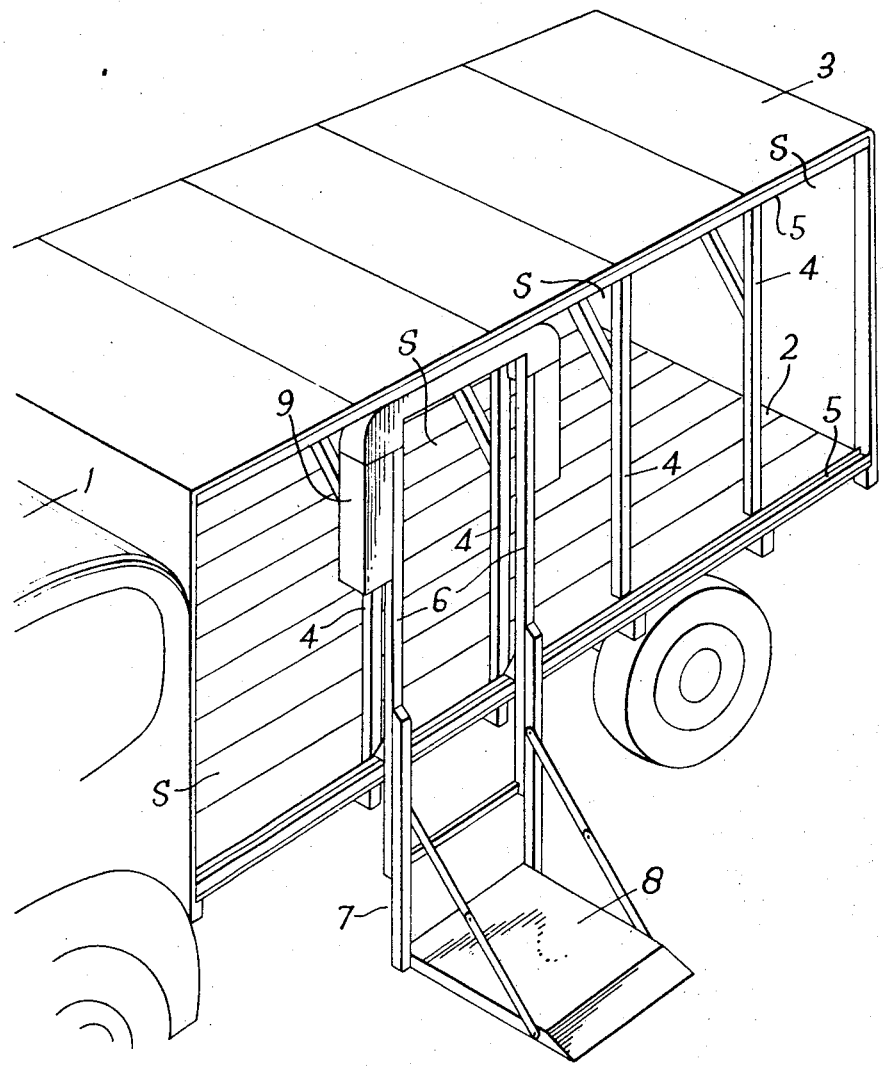

In order that the invention may be more clearly understood and readily carried into practical effect, specific constructional examples thereof will now be described with reference to the accompanying drawings, wherein:

FIGURE 1 is a perspective view in purely diagrammatic form, illustrating the application of the improved loading and unloading apparatus to a motor lorry, the said apparatus being shown in operative condition, FIGURE 2 is a further perspective view of a practical type of goods vehicle having the said apparatus applied thereto, the load-carrying platform in this case being shown folded up and stored away, FIGURE 3 is a vertical sectional view taken on the line III—III of FIGURE 2, FIGURE 4 is a horizontal sectional view taken on the line IV—IV of FIGURE 2.

Figure 5:
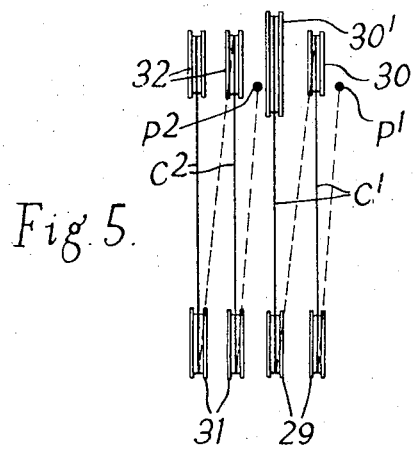
Figure 6:
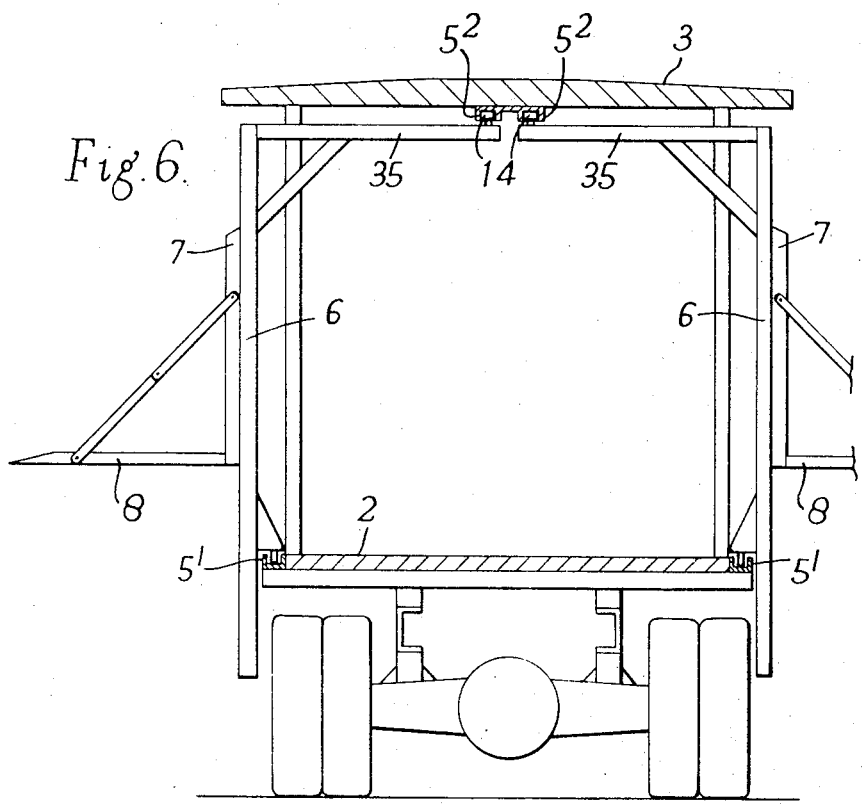

FIGURE 5 is a diagrammatic side view of the arrangement of chains or cables and pulleys employd in the form of the apparatus illustrated in FIGURES 2–4, and as seen in the direction of the arrow A in FIGURE 4, FIGURE 6 is a diagrammatic cross-sectional view of a vehicle equipped with traversing lifts at both sides, this figure also depicting a modification, hereinafter to be described.

Referring to FIGURE 1 of the drawings it will be seen that the diagrammatically illustrated lorry 1 has a horizontal load-supporting floor 2 above which a horizontal roof 3 is supported by upright supports 4 which extend vertically upwards at suitably spaced intervals along opposite lateral edges of the said floor. Upper and lower elongated channel-shaped guides 5 are mounted at the upper and lower ends of the supports 4 so as to extend horizontally in vertically spaced relationship along a lateral side of the vehicle 1. A vertically disposed frame 6 has its upper and lower ends engaged in the channel-shaped guides 5 and is slidable, i.e. traversible laterally, to any position between the opposite ends of said guides.

The width of the horizontally slidable frame 6 measured in a direction parallel to the intended direction of travel of the lorry 1 is equal or approximately equal to the spaces between neighbouring supports 4 so that, in the particular example illustrated, five loading and unloading stations S are provided along the side of the lorry 1. A load-carrying structure in the form of a lift generally indicated by the reference numeral 7 is connected to and suspended within the frame 6 by means of chain or cables. The structure 7 includes a hinged platform 8 adapted to support heavy loads of various kinds. The frame 6 also carries power-operated means in the form of a suitably encased hydraulic ram unit 9. The chain or cable connection of the unit 9 to the structure 7 is not illustrated in FIGURE 1, and it will be readily apparent that other known forms of connection are suitable for this purpose. In any event, the ram unit 9 is arranged to move the structure 7 relative to guides carried by the frame 6 between the position shown in FIGURE 1 in which the platform 8 is located at approximately ground level and a position in which said platform is located either at the same level as that of the floor 2 or above this level for tiered loading. If desired, the platform 8 may be replaced by a cradle, hook, jaws or the like wherever such would be more convenient having regard to the nature of the particular goods which the apparatus is called upon to deal with.

Whenever the loader platform 8 is raised for stowage it is constrained to move inwards until it is within the overall body width. The platform can be stowed at any of the stations S.

The ram unit 9 may incorporate or be associated with a pump adapted to be driven by any suitable means. For example, power for the pump may be provided by a power take off unit, a mains or a battery-operated electric motor or a petrol or a diesel engine. Alternatively, a hand pump may be employed. If, as may be, the pump is remote from the loading and unloading apparatus, then it could be driven by the engine of the lorry 1. In this case, pipes would connect the pump to a plurality of points corresponding to the five stations along the side of the lorry, and flexible pipes provided with quick-release connections would be employed to couple the ram unit 9 to whichever point corresponds to the station at which the lift 7 is to be used. A mains-operated electric motor may take the place of the unit 9 provided all the delivery and collection points served by the vehicle have mains outlets available.

The sides of the lorry 1 may be left open as depicted in FIGURE 1, or, alternatively, they may be covered by canvas sheets, roller shutters or sliding doors.

Moreover, the invention is applicable to wholly open in addition to covered vehicles.

In the more developed form of the invention illustrated in FIGURES 2–4, the framework including the vertical supports 4 is constructed to provide three loading and unloading stations S at a side of the vehicle. As illustrated in FIGURE 2, the side of the vehicle is closeable at each such station by a roller shutter 10, and in this figure the hinged platform 8 is shown turned up in its stowed-away position. In FIGURE 3 it will be seen that the lower horizontal guide channel 5' for guidance of the laterally traversible frame 6 is supported upon cross members such as 11 of the vehicle body and is also secured to the outer faces of the supports 4. Extending across the back of the frame 6, somewhat above its lower end, is a bracket 12 of right-angular cross-section which is reinforced by strengthening webs such as 12a. Secured beneath the horizontal flange of the bracket 12 are rollers 13 which run in and bear upon the bottom of the channel 5'. The rotational axes of these rollers is horizontal. The upper horizontal guide channel $5^2$ is attached both to the underside of the roof 3 and also to the outer faces of the upright supports 4. In the last mentioned channel are provided rollers 14 which, being mounted to rotate about vertical axes engage opposite sides of the said channel. The rollers 14 are mounted upon a bracket 15 of angular section which is secured to the back of a hollow box section member 16 forming the top of the frame 6. The vertical side members of this frame are constituted by combined angle irons and channels 17 and 18 which are connected at their lower extremities by a horizontal rail 19.

The load-carrying structure, i.e. goods lift 7 in this example, includes two suitably spaced vertical members 20 each of which has secured to the back thereof a length of angle iron 21 constituting a lifting slide or runner which is engaged in and is slidable up and down within the composite guide sections 17, 18. The goods platform 8, fabricated of box section members, is hinged or pivoted to, and connects, the lower ends of the vertical members 20 of the lift. The reference numeral 22 indicates fulcrum pieces which are provided at opposite sides of the platform 8, the pivotal axes being indicated at $a$.

Mounted upon one side of the frame 6 is a housing 23 accommodating a ram unit 24, whereas on the opposite side of the said frame there is a similar housing 25 encasing a power unit 26, e.g. in the form of a battery-operated electric motor (see FIGURE 4). The power unit drives a pump whereby oil under pressure is supplied to the ram. The upper ends of the housings 23 and 25 are connected to the opposite ends of the box section member 16 by means of hollow pulley casings 27 and 28 respectively. The hollow parts 16, 23, 25, 27 and 28 thus provide an encasement for two chains or cables C' and $C^2$ and associated pulleys 29, 30, 30', 31 and 32 through the medium of which the goods lift is raised and lowered (see FIGURE 5). The portion of the chain or cable C' depending from the pulley 30' is attached to the left-hand lifting slide 21, whereas the portion of the chain or cable $C^2$ depending from the left-hand (in FIGURE 5) pulley 32 is attached to the right-hand lifting slide. P' and $P^2$ are anchor points for the chains or cables C' and $C^2$ respectively. The chains or cables extend down through the guide sections 17, 18 and are attached to the runners 21.

Whenever the frame 6 is traversed laterally and thus moved from one loading and unloading station S to another, as occasion demands, an electrical contact 33 on the said frame is automatically brought into co-operative relationship with another contact 34 on a convenient part of the vertical body (the roof 3 as shown in FIGURE 3) to complete an electrical circuit including the battery-operated electric motor 26.

Instead of the two horizontal guide channels 5' and $5^2$ being vertically spaced one directly above the other in a common plane at a side of the vehicle as illustrated in FIGURE 3, it is possible for the upper channel $5^2$ to be alternatively disposed at or near the longitudinal centre line of the vehicle (as diagrammatically shown in FIGURE 6). In this modification the frames 6 require to have inwardly directed horizontal extensions 35 to carry the rollers 14. FIGURE 6 incidentally also illustrates lifts at opposite sides of a vehicle and the fact that the goods platforms 8 may be elevated to positions above the vehicle floor 2. The herein described apparatus may be made for fitting to existing vehicles although it is within the scope of the invention to provide such apparatus as an integral part of such a vehicle.

I claim:

1. In a wheeled vehicle, in combination, a vehicle body provided with a load-bearing floor; a framework at at least one side of said body constructed to provide in that side a plurality of loading and unloading stations; horizontal guides spaced heightwise on said framework; a frame movable horizontally along said guides from one to another of said stations; a load-carrying structure mounted on said frame for movement up and down relative to the said horizontally movable frame to move goods between ground level and at least one other level coincident with or above the load-bearing floor, means for effecting such up and down movements, and said load-carrying structure also being mounted for movement between an extended position for normal operation and a stowage position within the overall width of the vehicle body.

2. A combination according to claim 1, wherein the horizontal guides are in the form of channels integral with the framework and the horizontally movable frame is furnished with rollers arranged to run in said channels.

3. A combination according to claim 1, wherein the load-carrying structure is in the form of a lift which is slidable vertically in guides provided on the horizontally movable frame.

4. A combination according to claim 3, wherein the lift includes a hinged loader platform which is capable of being folded up for stowage and, when so folded, occupies said position within the overall width of the vehicle body.

5. A combination according to claim 1, which includes sets of pulleys; two cables which are passed around said pulleys, each of said cables being anchored to a fixed point on the horizontally movable frame at one end and at the other end being attached to the appropriate side of the load-carrying structure; and a hydraulic ram unit for imparting a lifting thrust to said structure through the medium of the cables.

6. A combination according to claim 5, which includes a power unit for operating a hydraulic pump whereby liquid under pressure is fed to the ram, the hydraulic ram unit and the power unit being accommodated in housings mounted upon respectively opposite sides of the horizontally movable frame.

7. A combination according to claim 5, wherein the power unit consists of a battery-operated electric motor, and which includes an electrical contact on the horizontally movable frame and an electrical contact on a part of the vehicle body at each of the loading and unloading stations whereby whenever the said frame is traversed from one station to another the contact on the frame will be automatically brought into engagement with the contact at the relevant station to complete an electrical circuit including the motor.

8. A combination according to claim 5, wherein the appropriate ends of the cables are attached to lifting slides which are secured to the load-carrying structure and engage and slide in vertical guides provided on the horizontally movable frame.

9. A combination according to claim 1, wherein there are two horizontal guides vertically spaced one directly above the other in a common plane at a side of the vehicle.

10. A combination according to claim 1, wherein there are two horizontal guides, the lower one being located at a side of the vehicle and the upper one near the longitudinal centre line of the vehicle.

11. A combination according to claim 1 wherein the means for effecting said up and down movement of the load-carrying structure is power actuated, and including means for conveying power from said framework to said power operated means at each of said loading stations.

References Cited

UNITED STATES PATENTS

| | | | |
|---|---|---|---|
| 2,530,341 | 11/1950 | Satsky | 214—75 |
| 2,876,913 | 3/1959 | Koth et al. | 187—7 X |
| 3,024,926 | 3/1962 | Nolden | 214—75 |
| 3,051,335 | 8/1962 | Bartlett | 214—75 |

ROBERT G. SHERIDAN, *Primary Examiner.*